United States Patent [19]
Tarzia

[11] 3,869,468
[45] Mar. 4, 1975

[54] 2-SUBSTITUTED OXAZOLE-4,5-DICARBOXAMIDES

[75] Inventor: Giorgio Tarzia, Roma, Italy

[73] Assignee: Gruppo Lepetit S.p.A., Milan, Italy

[22] Filed: Nov. 6, 1972

[21] Appl. No.: 304,001

[30] Foreign Application Priority Data
Nov. 15, 1971   Italy.................................. 31096/71

[52] U.S. Cl.... 260/307 R, 260/247.1, 260/247.2 A, 260/268 C, 260/293.67, 424/248, 424/250, 424/267, 424/272
[51] Int. Cl............................................. C07d 85/44
[58] Field of Search....... 260/307 R, 268 C, 293.67, 260/247.1, 247.2 A

[56] References Cited
OTHER PUBLICATIONS
Morrison et al. – "Organic Chemistry" – Allyn & Bacon, Inc. – Boston, (1959), pages 534,474,480,484.

Primary Examiner—Raymond V. Rush
Attorney, Agent, or Firm—Theodore Post; C. Kenneth Bjork

[57] ABSTRACT
Pharmacologically active 2,4,5-trisubstituted oxazoles corresponding to the formula

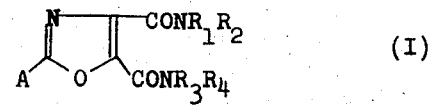

wherein A represents cyclohexyl, 2-thienyl or a group represented by the formula

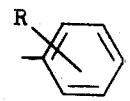

wherein R represents a p-phenyl group or one to three substituents selected from the group of hydrogen, hydroxy, lower alkyl, halo, halo-lower alkyl, nitro, cyano, amino, acetamino, carboxy, carbamyl, sulfamoyl and lower alkoxy; $R_1$ and $R_3$ are selected from the group of hydrogen, lower alkyl, lower alkenyl, cycloalkyl, phenyl, phenyl-lower alkyl, hydroxy-lower alkyl, lower acyloxy-lower alkyl, hydroxy, amino, lower alkylideneamino, cycloalkylideneamino, benzylideneamino; $R_2$ and $R_4$ are selected from the group of hydrogen, lower alkyl, lower alkenyl, cycloalkyl, phenyl, phenyl-lower alkyl, hydroxy-lower alkyl, lower acyloxy-lower alkyl; each of the pairs $R_1$, $R_2$ and $R_3$, $R_4$ may also form with the amino nitrogen atom a 5- to 7-membered heterocyclic ring which may contain one other heteroatom selected from N and O.

13 Claims, No Drawings

2-SUBSTITUTED OXAZOLE-4,5-DICARBOXAMIDES

Summary of the Invention

This invention relates to new pharmacologically active 2,4,5-trisubstituted oxazoles corresponding to the formula

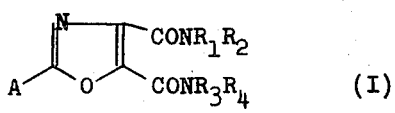   (I)

wherein A is cyclohexyl, thienyl or a group represented by

wherein R represents a p-phenyl group or one to three substituents selected from the group consisting of hydrogen, hydroxy, lower alkyl, halo, halo-lower alkyl, nitro, cyano, amino, acetamino, carboxy, carbamyl, sulfamoyl and lower alkoxy; $R_1$ and $R_3$ are selected from the group consisting of hydrogen, lower alkyl, lower alkenyl, cycloalkyl, phenyl, phenyl-lower alkyl, hydroxy-lower alkyl, lower acyloxy-lower alkyl, hydroxy, amino, lower alkylideneamino, cycloalkylideneamino, benzylideneamino; $R_2$ and $R_4$ are selected from hydrogen, lower alkyl, lower alkenyl, cycloalkyl, phenyl, phenyl-lower alkyl, hydroxy-lower alkyl, acyloxy-lower alkyl; each of the pairs $R_1$, $R_2$ and $R_3$, $R_4$ may also form with the amino nitrogen atom a 5- to 7-membered heterocyclic ring which may contain another hetero-atom selected from N and O. In the specification and claims, lower alkyl and lower alkenyl designate groups which are straight or branched and contain from 1 to 6 carbon atoms for the former and 3 to 6 carbon atoms for the latter; lower alkylidene designates 2 to 6 carbon groups; lower acyloxy designates acetoxy, propionyloxy or butyryloxy; cycloalkyl designates 5- to 8-membered rings; phenyl and benzylidene groups in the present invention designate phenyl or halophenyl, lower alkyl phenyl, and lower alkoxy phenyl and benzylidene, halobenzylidene, lower alkylbenzylidene and lower alkoxybenzylidene, respectively; and halo designates fluoro, chloro or bromo. Representative members of the heterocyclic ring formed by the pair $R_1$, $R_2$ or $R_3$, $R_4$ in combination with the amino nitrogen are piperidine, pyrrolidine, morpholine and piperazine.

A preferred group of compounds comprises those wherein A is cyclohexyl, thienyl or a

group wherein R is hydrogen or p-phenyl or represents from one to three substituents selected from methyl, chloro, fluoro, methoxy, hydroxy or trifluoromethyl. It is obvious that when only one substituent is present it can be in the ortho, meta or para position of the phenyl ring. When more than one substituent is present, all their possible mutual positions are usually available.

Another group of compounds are those wherein $R_1$ and $R_3$ substituents independently represent one of hydrogen, lower alkyl, hydroxy, cyclopentyl, cyclohexyl, amino, isopropylideneamino and p-methylbenzylideneamino; $R_2$ and $R_4$ in such compounds each independently represents hydrogen or lower alkyl.

The compounds of this invention have antiinflammatory activity. Some also have analgesic activity. The biological activity of these compounds is coupled with a very low toxicity.

DESCRIPTION OF THE PREFERRED EMBODIMENTS

A general method of preparation of the inventive compounds comprises the use of a di-lower alkyl ester of 4,5-oxazoledicarboxylic acid having an A substituent in the 2-position. Alternatively, the corresponding dicarbonyl halides or acid anhydrides may be suitably employed as the starting materials.

When a compound of Formula I is desired wherein the pairs $R_1$, $R_2$ and $R_3$, $R_4$ have the significance given, one of the aforementioned oxazole dicarbonyl halides or acid anhydrides is reacted with at least two equimolecular proportions of an amine of the formula

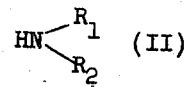   (II)

wherein $R_1$ and $R_2$ have the same significance as above. The presence of a solvent is not essential but advantageous. When a dicarbonyl halide is used as the starting material, the presence of a tertiary organic base or an excess of the amine reactant of Formula II is required as an acid acceptor for the hydrogen halide which forms during the reaction. A preferred embodiment of the inventive process involves the use of solvents. Thus, for instance, if oxazole-4,5-dicarboxy esters are used as the starting materials, the preferred solvents are selected from the lower alkanols having 1 to 4 carbon atoms or an excess of the amine reactant. When oxazole-4,5-dicarbonyl halides are employed, the solvent is generally selected from inert organic liquids such as, for example, benzene, toluene, chlorinated hydrocarbons, dioxane and tetrahydrofuran. The temperature at which the reaction is carried out is not critical and is generally selected in the range between room temperature and the boiling temperature of the solvent.

The compounds of the invention wherein $R_1$ and/or $R_3$ represent a lower alkylideneamino or a cycloalkylideneamino or a phenylalkylideneamino group are more readily prepared from the corresponding derivative wherein the foregoing groups are amino groups via a condensation with an aldehyde or ketone by conventional methods.

The compounds wherein one or more of the groups $R_1$, $R_2$, $R_3$ and $R_4$ is lower acyloxy-lower alkyl are prepared from the corresponding hydroxy compounds through known acylation procedures.

In most cases, the products of the invention are white crystalline solids which are generally soluble in organic solvents such as, for example, acetic acid, dioxane, dimethylformamide and dimethylsulfoxide. The compounds which are secondary amides are also fairly soluble in lower alkanols and chloroform. The compounds generally have a very low solubility in water. Suitable solvents for crystallizing these products are water-dimethylformamide mixtures, lower alkanols and in some instances water or hexane, depending upon the nature of the groups $R_1$, $R_2$, $R_3$ and $R_4$.

In experiments with representative compounds in mice, the compounds of Examples 1, 11, 13, 20, 21, 24, 33, 37, 39, 41, 53, and 56 showed anti-inflammatory activity. Doses varying from one-twentieth to one-fifth of the $LD_{50}$ values per os were found to be highly effective in the carrageenin-induced edema test. The compounds were administered orally in dosages varying from 10 to 200 mg/kg and the percent decreases of the induced edema observed varied from about 30 to about 90. The acute toxicity is generally very low, most of the compounds tested having $LD_{50}$ values higher than 1000 mg/kg. p.o. Also, the gastrointestinal ulcerogenicity is very low when compared with that of other anti-inflammatory substances such as, for example, phenylbutazone. The preferred route of administration of these compounds is by mouth although other routes may be usefully employed. For this purpose, the substances are embodied in pharmaceutical dosage forms such as tablets, capsules, suspensions and the like. The dosage unit may contain the usual excipients such as, for example, starch, gums, alcohols, sugars, fatty acids, cellulose derivatives and tragacanth. The daily dosage range is from about 0.5 to about 50 mg/kg of body weight, preferably administered in divided doses.

The following non-limitative examples describe in detail the compounds of this invention and methods for their preparation.

EXAMPLE 1:

2-Phenyl-4,5-oxazoledicarboxamide

Twenty-five ml. of aqueous 35% ammonium hydroxide is added dropwise to a solution of 5 g. of 2-phenyl-4,5-oxazoledicarboxylic acid diethyl ester in 25 ml. of 95% ethanol. The mixture is stirred for two hours and the resulting precipitate is collected by filtration, washed with ethanol, dissolved in hot dimethylformamide (DMF) and precipitated by addition of water. Yield 3.5 g., m.p. 286°–7°C.

EXAMPLES 2–36

Pursuant to the method of Example 1, the following 4,5-oxazoledicarboxamides are obtained:

| Example No. | Compound | Reactants -4,5-oxazoledi-carboxylic acid diethyl ester | amine | Solvent of Crystallization | M.P.°C |
|---|---|---|---|---|---|
| 2 | 2-(p-tolyl)-4,5-oxazoledicarboxamide | 2-(p-tolyl)- | ammonium hydroxide | DMF/water | 275–80 |
| 3 | 2-phenyl-4,5-oxazoledicarboxylic acid dihydrazide | 2-phenyl- | hydrazine | DMF/water | 235 |
| 4 | 2-(p-chlorophenyl)-4,5-oxazoledicarboxamide | 2-(p-chlorophenyl)- | ammonium hydroxide | DMF/water | >285 |
| 5 | N,N'-dipentyl-2-phenyl-4,5-oxazoledicarboxamide | 2-phenyl- | pentylamine | hexane | 159–61 |
| 6 | N,N'-dibutyl-2-phenyl-4,5-oxazoledicarboxamide | 2-phenyl- | butylamine | hexane | 74–5 |
| 7 | N,N'-dibenzyl-2-phenyl-4,5-oxazoledicarboxamide | 2-phenyl- | benzylamine | ethanol | 143 |
| 8 | N,N'-diallyl-2-phenyl-4,5-oxazoledicarboxamide | 2-phenyl- | allylamine | ethanol/water | 93–4 |
| 9 | N,N'-bis(2-hydroxyethyl)-2-phenyl-4,5-oxazoledicarboxamide | 2-phenyl- | (2-hydroxyethyl)amine | water | 202 |
| 10 | N,N'-dimethyl-2-phenyl-4,5-oxazoledicarboxamide | 2-phenyl- | methylamine | DMF/ethyl ether | 195 |
| 11 | N,N'-dicyclohexyl-2-phenyl-4,5-oxazoledicarboxamide | 2-phenyl- | cyclohexylamine | ethanol | 114–5 |
| 12 | N,N'-dipropyl-2-phenyl-4,5-oxazoledicarboxamide | 2-phenyl- | propylamine | ethanol-water | 86 |
| 13 | N,N'-diethyl-2-phenyl-4,5-oxazoledicarboxamide | 2-phenyl- | ethylamine | ethanol | 129–30 |
| 14 | 4,5-bis(morpholinocarbonyl)-2-phenyloxazole | 2-phenyl- | morpholine | ethanol | 186 |
| 15 | N,N'-bis(3-hydroxypropyl)-2-phenyl-4,5-oxazoledicarboxamide | 2-phenyl- | 3-hydroxypropylamine | water | 188 |
| 16 | N,N'-diisopropyl-2-(p-tolyl)-4,5-oxazoledicarboxamide | 2-(p-tolyl)- | isopropylamine | methanol | 129–30 |
| 17 | N,N'-dicyclohexyl-2-(p-tolyl)-4,5-oxazoledicarboxamide | 2-(p-tolyl)- | cyclohexylamine | ethanol | 155–7 |
| 18 | N,N'-diethyl-2-(p-tolyl)-4,5-oxazoledicarboxamide | 2-(p-tolyl)- | ethylamine | ethanol | 179–80 |
| 19 | 4,5-bis(piperidinocarbonyl)-2-phenyloxazole | 2-phenyl- | piperidine | ligroin | 101 |
| 20 | N,N'-diisobutyl-2-phenyl-4,5-oxazoledicarboxamide | 2-phenyl- | isobutylamine | ethanol-water | 91–2 |
| 21 | N,N'-diisopropyl-2-phenyl-4,5-oxazoledicarboxamide | 2-phenyl- | isopropylamine | ligroin | 128 |
| 22 | 2-(3,4,5-trimethoxyphenyl)-4,5-oxazoledicarboxamide | 2-(3,4,5-trimethoxyphenyl)- | ammonium hydroxide | DMF diethyl ether | 299–301 |
| 23 | 2-(p-methoxyphenyl)-4,5-oxazoledicarboxamide | 2-(p-methoxyphenyl)- | ammonium hydroxide | DMF/diethyl ether | >280 |
| 24 | 2-(p-fluorophenyl)-4,5-oxazoledicarboxamide | 2-(p-fluorophenyl)- | ammonium hydroxide | DMF/diethyl ether | 302–4 |
| 25 | 2-(3,5-dimethoxyphenyl)-4,5-oxazoledicarboxamide | 2-(3,5-dimethoxyphenyl)- | ammonium hydroxide | DMF/ethyl ether | 269–71 |
| 26 | 2-(m-tolyl)-4,5-oxazoledicarboxamide | 2-(m-tolyl)- | ammonium hydroxide | DMF/ethyl ether | 320–23 |
| 27 | 2-(o-tolyl)-4,5-oxazoledicarboxamide | 2-(o-tolyl)- | ammonium hydroxide | DMF/water | 295 |
| 28 | N,N'-dicycloheptyl-2-phenyl-4,5-oxazoledicarboxamide | 2-phenyl- | cycloheptylamine | methanol | 124 |
| 29 | 2-(p-tert-butyl)-phenyl-4,5-oxazoledicarboxamide | 2-(p-tert.butyl)phenyl- | ammonium hydroxide | ethanol-water | 314–5 |

Continued

| Example No. | Compound | Reactants -4,5-oxazoledi-carboxylic acid diethyl ester | amine | Solvent of Crystallization | M.P.°C |
|---|---|---|---|---|---|
| 30 | 2-(m-trifluoromethylphenyl)-4,5-oxazole-dicarboxamide | 2-(m-trifluoromethyl-phenyl)- | ammonium hydroxide | ethanol-water | 327-28 |
| 31 | 2-(m-methoxyphenyl)-4,5-oxazoledicar-boxamide | 2-(m-methoxy-phenyl)- | ammonium hydroxide | DMF/ethyl ether | 279-81 |
| 32 | 2-(m-chlorophenyl)-4,5-oxazoledicar-boxamide | 2-(m-chloro-phenyl)- | ammonium hydroxide | DMF/ethyl ether | 323-5 |
| 33 | 2-(o-fluorophenyl)-4,5-oxazoledicar-boxamide | 2-(o-fluoro-phenyl)- | ammonium hydroxide | DMF/ethyl ether | 260-70 |
| 34 | N,N'-dicyclohexyl-2-(p-fluorophenyl)--4,5-oxazoledicarboxamide | 2-(p-fluoro-phenyl)- | cyclohexyl-amine | ethanol | 138-40 |
| 35 | 2-(o-chlorophenyl)-4,5-oxazoledicar-boxamide | 2-(o-chloro-phenyl)- | ammonium hydroxide | DMF/ethyl-ether | 282-9 |
| 36 | 2-(m-fluorophenyl)-4,5-oxazoledicar-boxamide | 2-(m-fluoro-phenyl)- | ammonium hydroxide | DMF/ethyl ether | 310-3 |

EXAMPLE 37:
2-(2-Thienyl)-4,5-oxazoledicarboxamide

The title compound is prepared by following the procedure of Example 1, using 2-thienyl-4,5-oxazoledicarboxylic acid diethyl ester as a starting material. M.p. 285°–287°C., crystallized from ethanol.

EXAMPLE 38:
2-Cyclohexyl-4,5-oxazoledicarboxamide

The title compound is prepared by following the procedure of Example 1, using 2-cyclohexyl-4,5-oxazoledicarboxylic acid diethyl ester as a starting material. M.P. 222°–223°C., crystallized from ethanol.

EXAMPLE 39:
2-Phenyl-N,N'-bis-(3-acetoxypropyl)-4,5-oxazoledicarboxamide

Six and a half g. of the compound described in Example 15 is suspended in 57 ml. of pyridine at room temperature and 57 ml. of acetic anhydride is added to the suspension. After agitation for 4 hours, the reaction mixture is poured into 500 ml. of water. The resulting mixture is then brought to pH 4.5 by addition of hydrochloric acid and the precipitate is collected on a filter and washed with water. The compound is crystallized from ethanol. Yield 7.6 g., m.p. 90°–92°C.

EXAMPLE 40:
2-Phenyl-N,N'-bis-(2-acetoxyethyl)-4,5-oxazoledicarboxamide

The compound is prepared by the procedure of the foregoing example, by using as a starting material the compound of Example 9. M.p. 130°–135°C., crystallized from ethanol.

EXAMPLE 41:
2-Phenyl-4,5-oxazoledicarbohydroxamic acid

To a solution of 4.7 g. of hydroxylamine hydrochloride in 60 ml. of methanol 8.5 g. of sodium hydroxide dissolved in 60 ml. of methanol is added. After filtering off the precipitated sodium chloride, the resulting solution is added to 10 g. of 2-phenyl-4,5-oxazoledicarboxylic acid diethyl ester in 50 ml. of methanol. The mixture is stirred for two hours and poured into ice water and the mixture adjusted to pH 3 with aqueous 10% HCl. The resulting crude precipitate is dissolved in aqueous 10% sodium hydroxide and recovered as the pure titular compound by acidification of the solution with aqueous 10% HCl. M.p. 218°–219°C., yield 5.4 g.

EXAMPLES 42–46

Pursuant to the procedure described in Example 41, the following 4,5-oxazoledicarbohydroxamic acids are prepared.

| Example No. | COMPOUND -4,5-oxazoledicarbohydroxamic acid | Reactants -4,5-oxazoledi-carboxylic acid diethyl ester | amine | M.P.°C |
|---|---|---|---|---|
| 42 | 2-(p-tolyl)- | 2-(p-tolyl)- | hydroxylamine | 200 |
| 43 | 2-(m-methoxyphenyl)- | 2-(o-methoxyphenyl)- | hydroxylamine | 188-90 |
| 44 | 2-(p-chlorophenyl)- | 2-(p-chlorophenyl)- | hydroxylamine | 204-5 |
| 45 | 2-(p-methoxyphenyl)- | 2-(p-methoxyphenyl)- | hydroxylamine | 215-6 |
| 46 | 2-(p-fluorophenyl)- | 2-(p-fluorophenyl)- | hydroxylamine | 197-8 |

EXAMPLE 47:
2-Phenyl-N,N,N'N'-tetrapropyl-4,5-oxazoledicarboxamide

Three g. of 2-phenyl-4,5-oxazoledicarboxylic acid diethyl ester is added to a solution containing 2.4 g. of potassium hydroxide in 40 ml. of 75% ethanol. After stirring for 2 hours at room temperature the ethanol is distilled off in vacuo at about 35°C. and the residual aqueous solution is adjusted to pH 2 with aqueous 10% HCl. The mixture is stirred for 40 minutes at room temperature with 120 ml. of ethyl acetate and the organic layer is separated and washed with aqueous saturated sodium chloride. On evaporation of the dried organic solution, 2-phenyl-4,5-oxazoledicarboxylic acid is obtained in a practically quantitative yield. This product may be used as such for the further reaction steps. A pure sample of the compound obtained by crystallization from ethyl acetate melts at 216°C. The crude acid is treated with 30 ml. of $SOCl_2$ and 1 ml. of dimethylformamide for 1 hour, and after elimination of the evolved hydrogen chloride in evaporation under vacuum is dissolved in 30 ml. of benzene and 12 ml. of dipropylamine in 50 ml. of benzene is added thereto with cooling. After one hour, the mixture is diluted with benzene and washed several times with aqueous 5% HCl. The organic solution is dried and evaporated in vacuo to give the title compound which, after crystallization from hexane, melts at 85°C. Yield 3.2 g.

EXAMPLES 48–55

The following compounds are prepared by the procedure of Example 47 by using the appropriate amine and oxazole starting reactants.

phenyl)-4,5-oxazoledicarboxylic acid diethyl ester, 2-(p-hydroxyphenyl)-4,5-oxazoledicarboxamide is obtained.

Alternatively the title compound may be prepared through alkaline hydrolysis with 1 N. NaOH of crude 2-(p-methanesulfonyloxyphenyl)-4,5-oxazoledicarboxamide which is turn is obtained from

| | | Reactants | | | |
|---|---|---|---|---|---|
| Example No. | Compound | -4,5-oxazoledicarboxylic acid diethyl ester | amine | Solvent of CRYSTALLIZATION | M.P.°C. of B.P. °C/mm Hg. |
| 48 | N,N'-2-triphenyl-4,5-oxazoledicarboxamide | 2-phenyl- | aniline | acetone | 203–4 |
| 49 | 4,5-bis-(pyrrolidinocarbonyl)-2-phenyloxazole | 2-phenyl- | pyrrolidine | ethyl acetate | 178 |
| 50 | N,N,N',N'-tetracyclohexyl-2-phenyl-4,5-oxazoledicarboxamide | 2-phenyl- | dicyclohexylamine | ethanol | 213–4 |
| 51 | N,N,N',N'-tetrabenzyl-2-phenyl-4,5-oxazoledicarboxamide | 2-phenyl- | dibenzylamine | ethanol | 143–4 |
| 52 | N,N'-dicyclooctyl-2-phenyl-4,5-oxazoledicarboxamide | 2-phenyl- | cyclooctylamine | methanol | 94–5 |
| 53 | N,N'-dicyclopentyl-2-phenyl-4,5-oxazoledicarboxamide | 2-phenyl- | cyclopentylamine | benzene-ligroin | 159–63 |
| 54 | N,N,N',N'-tetramethyl-2-phenyl-4,5-oxazoledicarboxamide | 2-phenyl- | dimethylamine | acetone-hexane | 120–1 |
| 55 | N,N,N',N'-tetraethyl-2-phenyl-4,5-oxazoledicarboxamide | 2-phenyl- | diethylamine | acetone-hexane | 190/0.6 |

EXAMPLE 56:

2-Phenyl-4,5-oxazoledicarboxylic acid bisisopropylidenehydrazide

Three hundred mg. of 2-phenyl-4,5-oxazoledicarboxylic acid dihydrazide is heated in 15 ml. of acetone for 30 minutes. On dilution with 50 ml. of hexane, the title compound is recovered in a practically quantitative yield. M.p. 230°C.

EXAMPLE 57:

2-Phenyl-4,5-oxazoledicarboxylic acid -bis-methylbenzylidenehydrazide

A mixture of 11 g. of 2-phenyl-4,5-oxazoledicarboxylic acid dihydrazide and 11 g. of p-tolualdehyde in 200 ml. of benzene is refluxed for 6 hours while the water which forms during the reaction is distilled off azeotropically. The title compound which precipitates on concentration of the solvent is crystallized from a mixture of dichloromethane and hexane. Yield 15 g., m.p. 273°–5°C.

EXAMPLE 58:

2-Phenyl-4,5-oxazoledicarboxylic acid bis-cyclohexylidenehydrazide

The title compound is prepared by the procedure of Example 57, substituting cyclohexanone in place of p-tolaldehyde. M.p. 143°–5°C. (crystallized from a mixture of dichloromethane and hexane).

EXAMPLE 59:

2-(4-Biphenylyl)-4,5-oxazoledicarboxamide

The title compound is prepared by the procedure of Example 1 by reacting the crude 2-(4-biphenylyl)-4,5-oxazoledicarboxylic acid diethyl ester with 35% ammonium hydroxide in ethanol. M.p. 325°–33°C.

EXAMPLE 60:

2-(p-Hydroxyphenyl)-4,5-oxazoledicarboxamide

Pursuant to the procedure of Example 1 and employing as the starting material the crude 2-(p-hydroxythe corresponding diethyl ester according to the procedure of Example 1. The title compound melts above 300°C.

The procedure similar to that of Example 1 is used to prepare the following compounds from the analogous dicarboxylic acid diethyl esters:

2-(m-nitrophenyl)-4,5-oxazoledicarboxamide
2-(p-nitrophenyl)-4,5-oxazoledicarboxamide
2-(p-cyanophenyl)-4,5-oxazoledicarboxamide
2-(p-carboxyphenyl)-4,5-oxazoledicarboxamide
2-(p-carbamylphenyl)-4,5-oxazoledicarboxamide
2-(o-aminophenyl)-4,5-oxazoledicarboxamide

EXAMPLE 61

The 4,5-oxazoledicarboxylic acid diethyl esters which are used as intermediates for the preparation of the inventive compounds are prepared according to the procedure described by Nobuo Somo et al. in Chem. Pharm. Bull. 15 (5) 619, 1967 for 2-phenyl-4,5-oxazoledicarboxylic acid diethyl ester. The imidate salts required for the preparation of these oxazole derivatives are prepared according to known literature methods. In the case of ortho-substituted benzimidate salts, the procedure of L. Weintraub et al., J. Org. Chem. 33, No. 4, 1679, has been used. The following new esters have been prepared:

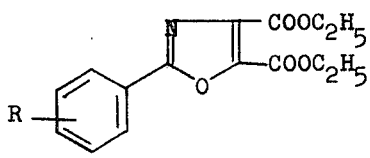

| R | M.P.°C. (or B.P./mm Hg.) |
|---|---|
| 3—CH₃ | 40–2 (light petroleum) |
| 4—OCH₃ | 72–4 (cyclohexane) |
| 4—CH₃ | 90 (cyclohexane) |
| 4—Cl | 64–5 (cyclohexane) |
| 4—F | 82–5 (cyclohexane) |
| 3—Cl | 73–5 (cyclohexane) |
| 3,4,5—OCH₃ | 108–10 (ethanol) |

| R | Continued M.P.°C. (or B.P./mm Hg.) |
|---|---|
| 3—CF₃ | 145-50/0.6 |
| 4—C(CH₃)₃ | 170-72/0.6 |
| 3,5—OCH₃ | 93-5 (ethanol) |
| 2—CH₃ | 120/0.5 |
| 3—OCH₃ | 73-4 (cyclohexane) |
| 2—Cl | 150/0.6 |
| 2—F | 57-9 (diethyl ether-light petroleum) |
| 3—F | 170/0.1 |
| 2-(2-Thienyl)-4,5-oxazoledicarboxylic acid diethyl ester | 90°-92°C. (cyclohexane) |
| 2-Cyclohexyl-4,5-oxazoledicarboxylic acid diethyl ester | 150°-155°C./0.1 mm Hg. |

We claim:

1. A compound represented by the formula

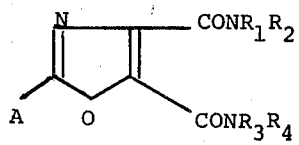

wherein A represents cyclohexyl, 2-thienyl or a group corresponding to the formula

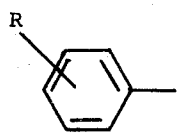

wherein R represents p-phenyl or one to three substituents selected from the group of hydrogen, hydroxy, lower alkyl, halo, halo-lower alkyl, and lower alkoxy; $R_1$ and $R_3$ are selected from the group of hydrogen, lower alkyl, lower alkenyl, 5 to 8 carbon atom cycloalkyl, phenyl, phenyl-lower alkyl, hydroxy-lower alkyl, 2 to 4 carbon atom straight-chain alkanoyloxy-lower alkyl, hydroxy, amino, lower alkylideneamino, 5 to 8 carbon atom cycloalkylideneamino and benzylideneamino; $R_2$ and $R_4$ are selected from the group of hydrogen, lower alkyl, lower alkenyl, 5 to 8 carbon atom cycloalkyl, phenyl, phenyl-lower alkyl, hydroxy-lower alkyl, 2 to 4 carbon atom straight-chain alkanoyloxy-lower alkyl; each of the pairs $R_1R_2$ and $R_3R_4$ are the same; and each of the pairs $R_1$, $R_2$ and $R_3$, $R_4$ may also form with the amino nitrogen atom pyrrolidinyl, piperazinyl, piperidinyl or morpholinyl.

2. The compound of claim 1 which is 2-phenyl-4,5-oxazoledicarboxamide.

3. The compound of claim 1 which is N,N'-dicyclohexyl-2-phenyl-4,5-oxazoledicarboxamide.

4. The compound of claim 1 which is N,N'-diethyl-2-phenyl-4,5-oxazoledicarboxamide.

5. The compound of claim 1 which is N,N'-diisobutyl-2-phenyl-4,5-oxazoledicarboxamide.

6. The compound of claim 1 which is N,N'-diisopropyl-2phenyl-4,5-oxazoledicarboxamide.

7. The compound of claim 1 which is 2-(p-fluorophenyl)-4,5-oxazoledicarboxamide.

8. The compound of claim 1 which is 2-(o-fluorophenyl)-4,5-oxazoledicarboxamide.

9. The compound of claim 1 which is 2-(2-thienyl)-4,5-oxazoledicarboxamide.

10. The compound of claim 1 which is 2-(phenyl)-N,N'-bis-(3-acetoxypropyl)-4,5-oxazoledicarboxamide.

11. The compound of claim 1 which is 2-phenyl-4,5-oxazoledicarbohydroxamic acid.

12. The compound of claim 1 which is N,N'-dicyclopentyl-2-phenyl-4,5-oxazoledicarboxamide.

13. The compound of claim 1 which is 2-phenyl-4,5-oxazoledicarboxylic acid bis-isopropylidenehydrazide.

* * * * *